July 15, 1952  H. M. STRONG  2,603,133
APPARATUS FOR MAKING OPTICAL WEDGES
Filed Dec. 13, 1948
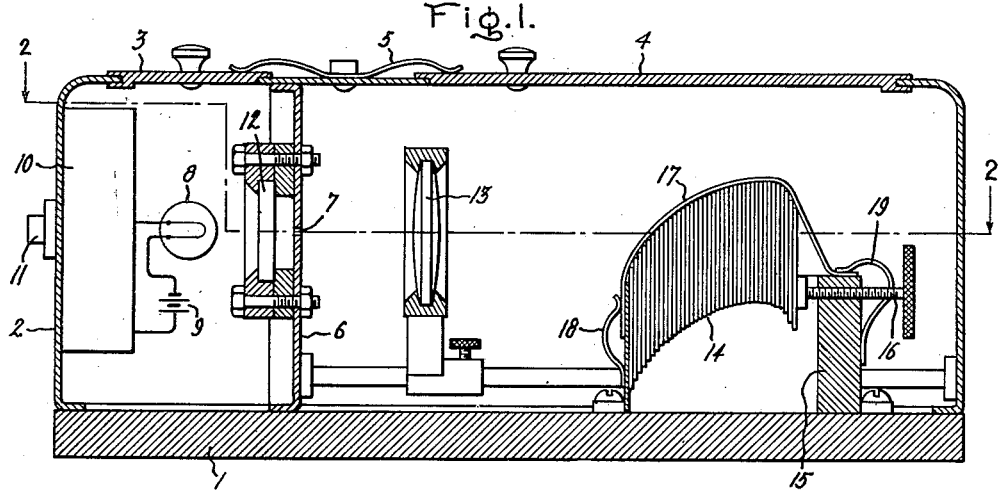
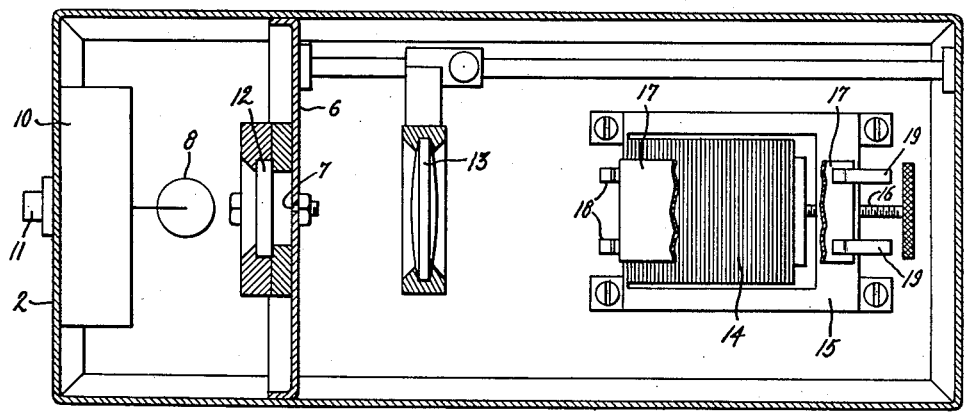
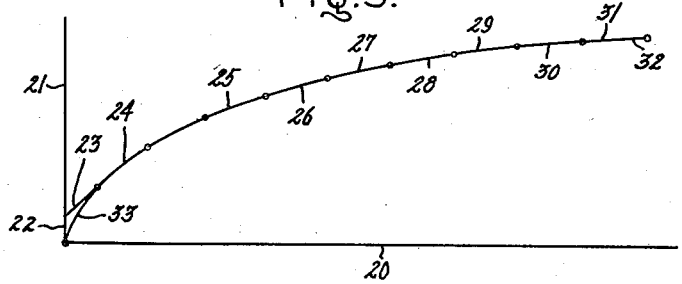
Inventor:
Herbert M. Strong,
by Richard E. Hosley
His Attorney.

Patented July 15, 1952

2,603,133

UNITED STATES PATENT OFFICE 2,603,133

APPARATUS FOR MAKING OPTICAL WEDGES

Herbert M. Strong, Schenectady, N. Y., assignor to General Electric Company, a corporation of New York Application December 13, 1948, Serial No. 65,028

1 Claim. (Cl. 95—1)

This invention relates to an improved apparatus for making optical wedges from photographic films.

Spectrometers, pyrometers, and other optical apparatus sometimes include an element for producing graduated brightnesses of light, which is commonly called an optical wedge. Such an element is relatively transparent at one of its ends, and relatively opaque at its other end; and the degree of opacity between the two ends is graduated according to some specified mathematical function. One form of optical wedge is a photographic film which has been darkened in a graduated manner by a varying exposure along the length of the film. In such a wedge, the opacity graduation may be specified in terms of optical density D, which is related to opacity $\Omega$ by the equation:

(1) $$D = \log_{10} \Omega$$

In most commercially available wedges, the graduation in density between the two ends is a substantially linear function of distance measured from one of the ends. Heretofore optical wedges have been quite expensive, and have been commercially available only in a small number of lengths and graduations in opacity.

An object of this invention is to provide an improved method and apparatus for the quick and inexpensive manufacture of optical wedges having any desired size and opacity graduation. Other objects and advantages will appear as the description proceeds.

The features of the invention which are believed to be novel and patentable are pointed out in the claim forming a part of this specification. For a better understanding of the invention, reference is made in the following description to the accompanying drawing, in which Fig. 1 is a sectional elevation of apparatus embodying principles of the invention, Fig. 2 is a section along the line 2—2, Fig 1, and Fig. 3 is a graph which will be used in explaining how the shape of the film-supporting surface is adjusted. Where like parts appear in more than one figure of the drawing, they are represented in each case by like reference numerals.

For an optical wedge made of a photographic film, the density graduation may be expressed by the equation:

(2) $$D = f(s)$$

where D is the optical density of the film, and $f(s)$ is the desired function of density in terms of distance $s$ from one end of the wedge. The well known photographic equation:

(3) $$D = \gamma (\log E - \log i)$$

is also applicable, in which E represents exposure of the film, and $\gamma$ and $\log i$ are characteristics of the particular film and developing process used which respectively represent the slope of the characteristic curve and the inertia of the film. Values of $\gamma$ and $\log i$ for particular films and developing processes are published by the film manufacturers. Another equation to be considered is:

(4) $$E = I_0 T \cos \theta$$

where $I_0$ represents intensity of light on a plane perpendicular to the light beam at the position of the film in units of one candle power at one meter distance, T is the time of exposure in seconds, and $\theta$ is the angle between incident light and the normal to the surface of the film.

From Equation 4 it is evident that the exposure of the film can be varied by varying $I_0$, T, or $\theta$. In making optical wedges according to the principles of this invention, $I_0$ and T preferably are the same for all portions of the film, and exposure is varied by varying the angle $\theta$. This is done by supporting the film on a surface which is carefully shaped as hereinafter described. The proper shape for this surface may be determined by simultaneous solution of Equations 2, 3, and 4.

Refer now to Figs. 1 and 2 of the drawing, which illustrate a preferred form of apparatus for making optical wedges according to principles of this invention. The apparatus is contained in a light-tight box, which may comprise a base 1 and a metal upper portion 2. Light-tight doors 3 and 4 are provided in the top of the box for access to interior compartments. Latch 5 holds the doors closed to prevent accidental exposure of the film.

The box is divided into two interior compartments by a bulkhead 6, approximately in the center of which is a "pin hole" opening 7. In the left-hand compartment is a small electric lamp 8, and a battery or other source of electric power 9. Timing mechanism 10, operated by a push button 11, is connected between the lamp and the battery. When button 11 is pressed, mechanism 10 connects lamp 8 to battery 9 for a predetermined interval of time, and provides a fixed amount of illumination at opening 7. Any conventional timing device suitable for this purpose may be used. A diffusing screen 12 is placed between the lamp and opening 7 to make the illumination of the opening more uniform, and to prevent formation of an image of the lamp filament in the right-hand compartment. Other means can be used with equally good results to supply a fixed illumination for a predetermined interval of time. For example, a continuous source of light may be used in conjunction with a shutter which admits light to the right-hand compartment only during the predetermined time interval.

In the right-hand compartment of the box, a collimating lens 13 focuses light from opening 7 into a beam of preferably parallel rays. Satisfactory results can be obtained if the rays are divergent instead of parallel, but determination of the proper shape for the film-supporting surface is slightly more difficult than when parallel rays are employed. Therefore, to simplify the the description, parallel rays are assumed hereinafter. Modifications necessary when using divergent rays will be apparent to those skilled in the art. Lens 13 should be of good quality, as any flaw in the lens may produce a flaw in the wedge.

Positioned in the path of the light beam is a film support which includes a plurality of laminations 14, placed together in the manner shown. The edges of these laminations are relatively adjustable in position, and form a film-supporting surface of adjustable shape. The laminations are held in place by suitable means such as clamp 15, which has a clamping screw 16 to lock the laminations securely in place after their edges have been properly adjusted. Photographic film 17, from which an optical wedge is to be made, is held in place on the surface formed by the edges of the laminations by springs 18 and 19.

The shape of the film-supporting surface may be adjusted in the following manner: First, Equations 2, 3, and 4 are solved simultaneously to determine $\theta$ as a function of distance measured from one end of the wedge. From this information, a curve is plotted having the shape of a longitudinal section of the required surface. The laminations are removed from the clamp and their edges are carefully fitted along this curve. With the laminations held in the same position in which they were fitted to the curve, they are replaced in the clamp and screw 16 is tightened to hold them in this position.

The manner in which the shape of the film-supporting surface is adjusted will now be more fully explained by means of an illustrative example. Suppose that it is desired to make an optical wedge 10 centimeters long, having an optical density which varies linearly with distance measured from one end of the wedge, from a minimum density of 0 to a maximum density of 2. Equation 2 then becomes $$D = \frac{s}{5}$$

where $s$ is distance in centimeters from the reference end of the wedge. Suppose that a particular film and developing process are to be used such that $\gamma$ equals 1.5 and log $i$ equals 0.5. Equation 3 then becomes $D = 1.5$ (log $E - 0.5$). Simultaneous solution of these two equations gives:

$$\log E = \frac{s}{7.5} - 0.5$$

By substituting various values between 0 and 10 for $s$, it may be found that log $E$ varies in value between 0.500 and 1.833.

From Equation 4, log cos $\theta =$ log $E -$ log $(I_0 T)$. The minimum usable value of $I_0 T$ is that which will give the maximum value of log E when $\theta$ equals 0, which is the angle at which incident light is normal to the surface of the film. Substituting the value 1.833 for log $E$ and 0 for $\theta$, it is evident that log $(I_0 T)$ must also equal 1.833, or $I_0 T$ equals 68 approximately. Thus, if the light beam has an intensity of 10, the exposure time should be 6.8 seconds.

By substituting values of $s$ in the above equations, it is possible to compute values for log E, log cos $\theta$ and $\theta$. The following table lists these values for each unitary value of $s$ from 0 to 10.

| s | log E | log cos $\theta$ | $\theta°$ |
|---|---|---|---|
| 0 | 0.500 | 8.667−10 | 87.3 |
| 1 | 0.633 | 8.800−10 | 86.4 |
| 2 | 0.767 | 8.934−10 | 85.1 |
| 3 | 0.900 | 9.067−10 | 83.3 |
| 4 | 1.033 | 9.200−10 | 80.9 |
| 5 | 1.167 | 9.334−10 | 78 |
| 6 | 1.300 | 9.467−10 | 73 |
| 7 | 1.433 | 9.600−10 | 66 |
| 8 | 1.567 | 9.734−10 | 57 |
| 9 | 1.700 | 9.867−10 | 43 |
| 10 | 1.833 | 0.000 | 0 |

From the values listed for $s$ and $\theta$, a curve can be plotted to represent a longitudinal section of the required film-supporting surface.

Refer now to Fig. 3, which illustrates a method of plotting such a curve. A horizontal line 20 is drawn to represent the direction of the light beam. A vertical line 21 may be drawn to provide a convenient base for measuring angle $\theta$. Since $\theta$ is equal to the angle between line 20 and the normal to the curve at any desired point, it is also equal to the angle between line 21 and the tangent to the curve at the same point.

For convenience, we start at the bottom of the table of values for $\theta$ and begin to plot the curve from the intersection of lines 20 and 21. The first value of $\theta$ at the bottom of the table is 0°. Therefore, the initial slope of the curve is vertical. The distance along the curve between points for which values of $\theta$ are tabulated is one centimeter. One-half this distance, or one-half centimeter, is measured off in the initial direction of 0°. A line 22 is drawn connecting the measured point with the starting point. The next value of $\theta$ is 43°. Therefore, the next line 23 is drawn at an angle of 43° to vertical line 21. Line 23 is drawn a full centimeter in length, and a dot is placed at its center to represent the point for which the value of $\theta$ was calculated. The next value of $\theta$ is 57°. Accordingly, line 24, one centimeter long, is drawn at an angle of 57° to the vertical. A dot is placed at the center of this line to represent the point at which the value of $\theta$ was calculated to be 57°. Similarly, lines 25 through 31, each one centimeter long, are drawn to represent the succeding values of $\theta$, and a dot is placed at the center of each line. Line 32, drawn at an angle to the vertical of 87.3°, corresponding to the value of $\theta$ at the top of the table, is one-half centimeter long.

The resulting curve, lines 22 through 32, comprises 11 sections, of which the two end sections are each one-half centimeter long and the other sections are each one centimeter long. The total length of the curve is ten centimeters, which is the desired length of the optical wedge. The two ends of this curve and the nine intermediate points represented by dots have slopes corresponding to calculated values of $\theta$. Thus curve 22—32 is an approximation of the desired curve.

A better approximation is obtained by drawing a smooth curve 33 tangent to curve 22—32 at its ends and at each of the intermediate points represented by a dot. Such an approximation is sufficiently good for most purposes. If greater accuracy is desired, this can be obtained by calculating $\theta$ for more closely spaced values of $s$: for example, 21 values of $s$, one-half centimeter apart could be calculated, and a curve could be constructed from these values in the manner described.

When curve 33 has been plotted, the edges of laminations 14, Figs. 1 and 2, are fitted to the curve to form a film-supporting surface of the desired shape. The laminations are then placed in clamp 15 and firmly secured in position by tightening screw 16. A piece of photographic film 17, having the values of $\gamma$ and log $i$ previously stated, is placed on this surface, as shown in Figs. 1 and 2, and exposed to a light beam having an intensity of 10 for 6.8 seconds. When this film is properly developed, it will have the density distribution required for the optical wedge which it was desired to manufacture.

Having described the principle of this invention and the best mode in which I have contemplated applying that principle, I wish it to be understood that the embodiment described is illustrative only, and that other means can be employed without departing from the true scope of the invention defined by the following claim.

What I claim as new and desire to secure by Letters Patent in the United States is:

Apparatus for making optical wedges from photographic films comprising, a body member having a pair of adjacent compartments separated by a wall having an aperture therein, a light source supported in one of said compartments, an adjustable film support positioned in the other compartment, said support comprising a plurality of laminations of a substantially rigid material arranged parallel with said wall and having edges relatively adjustable to form a desired contour, means to hold the laminations in adjusted positions, means to hold a photographic film along the contour formed by said edges, and a collimating lens positioned between said aperture and said film support.

HERBERT M. STRONG.

REFERENCES CITED

The following references are of record in the file of this patent:

UNITED STATES PATENTS

| Number    | Name           | Date          |
|-----------|----------------|---------------|
| 1,245,606 | MacCurdy et al.| Nov. 6, 1917  |
| 1,858,786 | Myers          | May 17, 1932  |
| 2,178,933 | Davis          | Nov. 7, 1939  |
| 2,386,538 | Bolsey         | Oct. 9, 1945  |
| 2,400,518 | Kreber         | May 21, 1946  |